United States Patent
Nevdahs et al.

(10) Patent No.: US 11,745,870 B1
(45) Date of Patent: Sep. 5, 2023

(54) SURVEILLANCE WITH SECURITY CAMERA DRONE

(71) Applicant: Alarm.com Incorporated, Tysons, VA (US)

(72) Inventors: Ilja Nevdahs, Carnikava (LV); Agris Kipurs, Jelgava (LV)

(73) Assignee: Alarm.com Incorporated, Tysons, VA (US)

( * ) Notice: Subject to any disclaimer, the term of this patent is extended or adjusted under 35 U.S.C. 154(b) by 511 days.

(21) Appl. No.: 16/819,968

(22) Filed: Mar. 16, 2020

Related U.S. Application Data

(60) Provisional application No. 62/819,174, filed on Mar. 15, 2019.

(51) Int. Cl.
*G05D 1/00* (2006.01)
*G07C 9/00* (2020.01)
*G06V 20/10* (2022.01)
*B64C 39/02* (2023.01)
*G08G 5/00* (2006.01)
*B64U 101/10* (2023.01)
*B64U 101/00* (2023.01)
*B64U 101/30* (2023.01)

(52) U.S. Cl.
CPC ............ *B64C 39/024* (2013.01); *G05D 1/0094* (2013.01); *G06V 20/176* (2022.01); *G07C 9/00309* (2013.01); *G08G 5/0069* (2013.01); *B64U 2101/00* (2023.01); *B64U 2101/30* (2023.01); *B64U 2201/10* (2023.01)

(58) Field of Classification Search
CPC ... B64C 39/024; G06V 20/176; G05D 1/0094; G07C 9/00309; G08G 5/0069; B64C 2201/126; B64C 2201/127; B64C 2201/141
See application file for complete search history.

(56) References Cited

U.S. PATENT DOCUMENTS

| | | | |
|---|---|---|---|
| 11,434,005 B1* | 9/2022 | Matheson et al. | G09G 5/37 |
| 2016/0107749 A1* | 4/2016 | Mucci | B64C 39/024 |
| | | | 701/3 |
| 2016/0300496 A1* | 10/2016 | Cheatham, III et al. | |
| | | | G08G 5/0013 |
| 2017/0019644 A1* | 1/2017 | K V et al. | G08B 13/19697 |
| 2017/0227965 A1* | 8/2017 | Decenzo et al. | G05D 1/0094 |
| 2019/0279151 A1* | 9/2019 | Felice et al. | G07C 9/257 |

* cited by examiner

*Primary Examiner* — Anne Marie Antonucci
*Assistant Examiner* — Jared C Bean
(74) *Attorney, Agent, or Firm* — Fish & Richardson P.C.

(57) ABSTRACT

Methods, systems, and apparatus, including computer programs encoded on a computer storage medium, for surveillance with security camera drone. In some implementations, a determination is made to begin surveillance of an in-house service with a drone. A duration of the in-house service is determined. A location to land the drone during the in-house service is determined based on the duration of the in-house service. Landing of the drone is initiated at the determined location.

20 Claims, 7 Drawing Sheets

SURVEILLANCE WITH SECURITY CAMERA DRONE

CROSS-REFERENCE TO RELATED APPLICATION

This application claims the benefit of U.S. Application No. 62/819,174, filed Mar. 15, 2019, which is incorporated by reference.

TECHNICAL FIELD

This specification generally relates to property surveillance.

BACKGROUND

Smart-locks have enabled unattended "in-house services," for example: in-house package delivery, in-the-fridge grocery delivery, as well as unattended house maintenance. Some "in-house services" may take a short time while others may take a longer time. Some services are spatially limited to small areas, others may require service personnel to traverse larger areas and/or multiple rooms inside the house.

SUMMARY

In some implementations, a security system can include a drone having a security camera. The security system can use the drone to monitor a person visiting a property to provide a service. The security system can send data to the drone, such as instructions including a triggering event. These instructions can indicate, for example, one or more of a time when a visitor is scheduled to arrive, an expected duration of the service visit, an indication that an access code has successfully been entered to gain entrance to the property, an area of the property that visitor is authorized to travel in, a time period that the visitor is authorized to visit for, and/or the type of service visit.

In some implementations, the drone can use these instructions to, for example, one or more of schedule a docking time to ensure that the drone has sufficient battery life when the visitor is anticipated on arriving, to determine one or more landing sites to make during the visit to conserve batter charge level while keeping the visitor in view of the drone, to access an environment map for the property or for an area of the property that the visitor is authorized to travel in, to generate an environment map for the property or for the area of the property that the visitor is authorized to travel in, to determine an authorized area for the service visit, to determine an authorized time for the service visit, and/or to modify an environment map for the area to include an indication of the authorized area.

In some implementations, the data received by the drone can also include output from one or more sensors. For example, the data can include output from a smart lock indicating that a door of the property has been unlocked. The drone can use this output to turn on one or more of its motors, to change its orientation, to change its elevation, to change a position of an onboard camera, and/or to change settings of the onboard camera (e.g., zoom, focal length, shutter speed, etc.), e.g., in order to aim the onboard camera towards the door and/or to place the door in the field of view of the onboard camera.

In some implementations, the drone can receive additional sensor data from other sensors. The drone can use this additional sensor data to determine or confirm one or more of when the visitor is entering the property, if the visitor has entered the property, a location of the visitor in the property, a location of the visitor in the property compared to the authorized area of the property, etc.

In some implementations, upon receiving a triggering event indicating an upcoming service visit, the drone positions itself so as to place a starting point, such as an entrance to the property, in its view. If an access code to a smart lock of the entrance is provided but the drone is not yet in the correct position, the drone, a control unit, or a server can send instructions to the smart lock to delay or cancel the unlocking of the smart lock. Alternatively, the smart lock can decide to delay or cancel the unlocking of the smart lock. For example, the smart lock can decide to delay unlocking of the smart lock for a predetermined amount of time when a visitor access code is entered. As another example, the smart lock can decide to delay unlocking of the smart lock if it has not yet received an indication that the drone is in position so as to place a starting point, such as an entrance to the property, in its view.

In some implementations, the drone can navigate around the property as it monitors the visitor. For example, the drone can navigate so as to keep the visitor in a field of view of its onboard camera.

In some implementations, the drone can generate and send notifications. These notifications can be sent to other system components, such as a system control unit. These notifications can be sent to an occupant of the property, such as to a computing device of the property owner. Similarly, these notifications can be sent to devices of service personnel, emergency services, etc. As an example, a notification can indicate whether the visitor has breached the boundary separating the authorized area from the rest of the property.

Implementations include methods, systems, apparatus, and computer programs recorded on computer storage devices, each configured to perform the operations of the methods.

Particular implementations of the subject matter described in this specification can be implemented so as to realize one or more of the following advantages. For example, the disclosed techniques can improve the protection of property in a number of ways. As in-house services rise in popularity, visitors are more frequently being given access to unattended homes which can present an increased risk of property theft and/or property damage.

The described system can reduce the likelihood of property theft or damage by, for example, having a drone with a security camera monitor visitors when they enter the property, and using the drone to determine if a visitor has entered a part of the property that they are not authorized to access. If a visitor has entered an unauthorized area, the described system can notify service personnel and/or the property owner. Similarly, the described system can, for example, notify service personnel and/or the property owner if the visitor has stayed in the property past an authorized time. Accordingly, the described system can help keep better track of visitors and prevent visitors from entering areas of a property that may, for example, contain valuables or sensitive information.

The disclosed techniques can also improve the safety for the occupants of a given property in a number of ways. For example, an owner of the property can monitor a live stream or stored video of the visit from the perspective of the drone. The owner of the property can use this image data to confirm that the person who arrived at the home was the anticipated visitor, to ensure that the visitor did not plant any items in the house such as cameras, to ensure that the visitor did not tamper with food, to ensure that the visitor did not steal any items such as medication, to ensure that the visitor performed the service they were hired to perform, etc.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
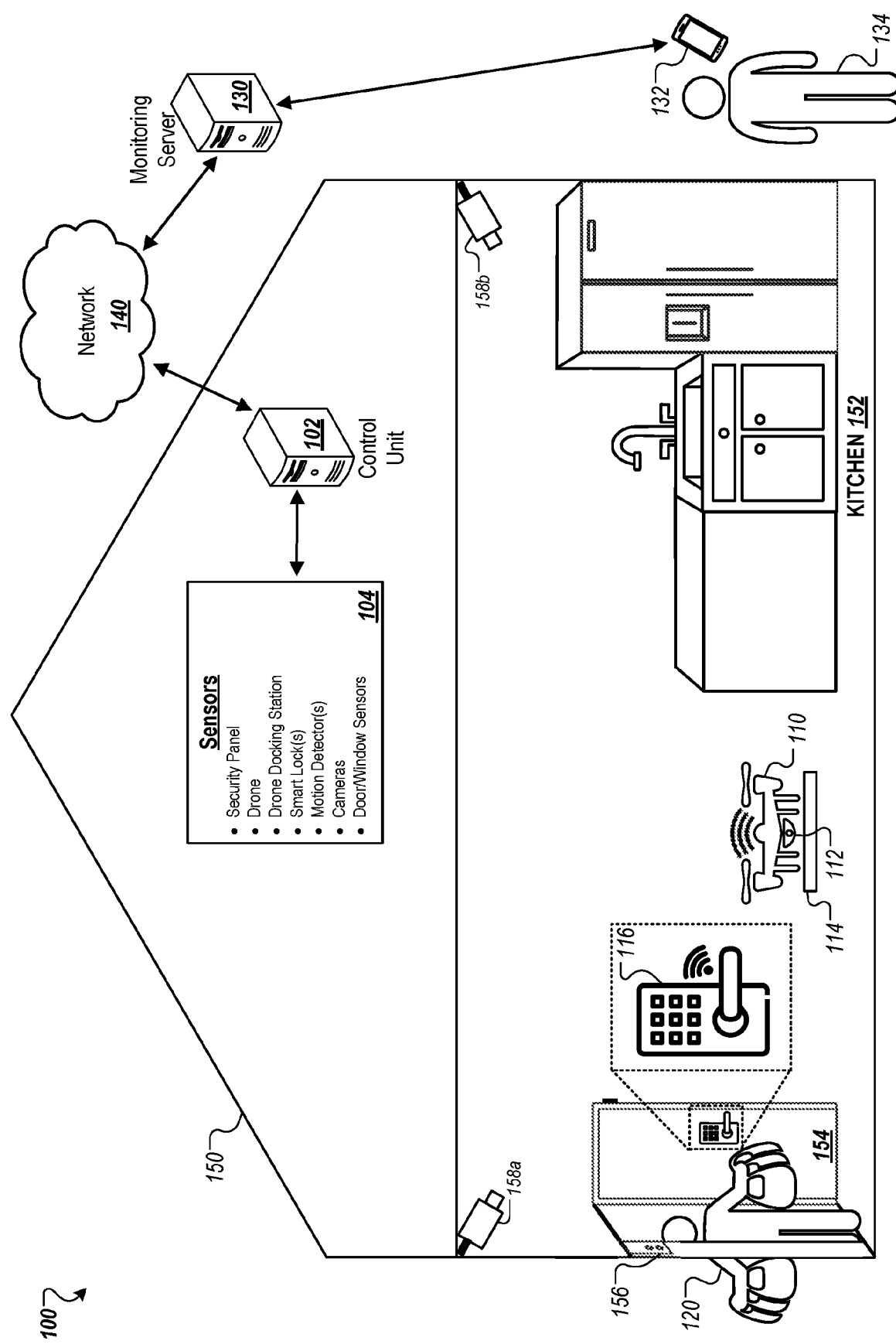
FIG. 1 is a diagram showing an example security monitoring system with a security camera drone.

A security system of a property may be integrated with numerous security sensors. These sensors can be used to monitor all or a portion of a property, and include a drone having a security camera. The security system can analyze data collected by the sensors to perform various functions, e.g., to one or more of determine if a person is likely to enter the property, determine if a person has entered the property, identify a person who has entered the property, track a person who has entered the property, and/or determine if a person who has entered the property travels outside of an authorized area of the property. In making these determinations, the security system can also use data provided by an occupant of the property, such as a visitor schedule. In making these determinations, the security system can leverage one or more machine learning models.

The one or more machine learning models can be updated using input from one or more authorized users, such as occupants of the property. The input may be requested by the security system. The input may be entered by an user such as an occupant of the property through an application on a computing device. The user's input can correspond to one or more decisions made by the security system including those decisions made by the drone. For example, the input can confirm or correct authorized areas for the service visit, drone landing sites selected for the service visit, an expected duration for the service visit, a maximum authorized time for the service visit, etc. In some implementations, the input is provided by the user prior to a visitor arriving, e.g., as a confirmation of decisions made by the security system. In some implementations, the security system requests feedback to the user by sending a request to the computing device of the user. The request can be made after the service visit is complete.

The security system can use the drone to monitor a person visiting a property to provide a service. The security system can send data to the drone, such as instructions including a triggering event. These instructions can indicate, for example, one or more of a time when a visitor is scheduled to arrive, an expected duration of the service visit, an indication that an access code has successfully been entered to gain entrance to the property, an area of the property that visitor is authorized to travel in, a time period that the visitor is authorized to visit for, the type of service visit, etc.

The instructions can indicate, for example, one or more of a time when a visitor is scheduled to arrive, an indication that an access code has successfully been entered, an area of the property that visitor is authorized to travel in, a time period that the visitor is authorized to visit for, the type of visit, etc. The drone can use these instructions to perform one or more actions such as one or more of to turn on (e.g., power on its motors, and/or take flight), to schedule a docking time to ensure that the drone has sufficient battery life when the visitor is anticipated on arriving, to access an environment map for the property or for an area of the property that the visitor is authorized to travel in, to generate an environment map for the property or for the area of the property that the visitor is authorized to travel in, to determine an authorized area for the visitor based on the type of visit, and/or to modify an environment map for the area to include an indication of the authorized area.

The data analyzed by the security system can include output from one or more sensors. For example, the data can include output from a smart lock indicating that a door of the property has been unlocked. The drone can use this output to perform one or more action such as one or more of to turn on one or more of its motors, to change its orientation, to change its elevation, to change a position of an onboard camera, and/or to change settings of the onboard camera (e.g., zoom, focal length, shutter speed, etc.), e.g., in order to aim the onboard camera towards the door and/or to place the door in the field of view of the onboard camera.

The drone can use sensor data to determine or confirm one or more of when the visitor is entering the property, if the visitor has entered the property, a location of the visitor in the property, a location of the visitor in the property compared to the authorized area of the property, etc.

The drone can navigate around the property as it monitors the visitor. For example, the drone can navigate so as to keep the visitor in a field of view of its onboard camera. In navigating around the property, the drone can reference an environment map for the property.

The drone can generate and send notifications. These notifications can be sent to other system components, such as a system control unit. These notifications can be sent to an occupant of the property, such as to a computing device of the property owner. Similarly, these notifications can be sent to devices of service personnel, emergency services, etc. As an example, a notification can indicate whether the visitor has breached the boundary separating the authorized area from the rest of the property.

FIG. 1 is a diagram showing an example security system 100 with a drone 110 having an onboard camera 112. The system 100 includes a control unit 102, a monitoring server 130, and security sensors 104. The sensors 104 are installed at a property 150. Various components of the system 100 can communicate over a network 140, through one or more wired connections, or through a combination of the network 140 and one or more wired connections.

The property 150 can be a residence such as a house, a townhouse, an apartment, a condominium, a duplex, etc. The property 150 can be a commercial property such as an office building, a floor of an office building, etc. The property 150 includes a front door 154 and a kitchen 152.

The control unit 102 can include one or more computing devices. The control unit 102 can have one or more corresponding security panels that serve as an interface of the control unit 102. The control unit 102 can communicate with the sensors 104 through a wired and/or wireless connection. For example, the control unit 102 can communicate wirelessly with the drone 110 over the network 140. The control unit 102 can receive sensor output information from the sensors 104. The control unit 102 can communicate with the monitoring server 130 over the network 140. The control unit 102 can communicate with a computing device 132 of an occupant 134, such as an owner of the property 150 in which the sensors 104 are installed. The control unit 102 can leverage one or more machine learning models to, for example, determine when a visitor 120 is anticipated to enter the property 150, when the visitor 120 has started to enter the property 150, when the visitor 120 is in the property 150, a location of the visitor 120 in the property 150, etc.

The sensors 104 can include one or more of, for example, one or more security panels (e.g., that provide an interface for the control unit 102), a docking station 114 for that drone 110 that can indicate if the drone 110 is docked and/or a battery charge level for the drone, smart locks such as the smart lock 116, one or more visible-light cameras such as the cameras 158a and 158b, infrared-light cameras (IR cameras), magnetic sensors/contact sensors (e.g., that are installed on one or more doors and/or windows) such as a magnetic door sensor 156, motion detectors, etc. The sensors 104 can also include an onboard camera 112 of the drone 110. The onboard camera 112 can be a visible-light camera. The drone 110 can output image data captured by the onboard camera 112 to the control unit 102 and/or the monitoring server 130.

The monitoring server 130 can include one or more computing devices. The monitoring server 130 can also include one or more data storage devices. The monitoring server 130 can communicate with the control unit 102 and/or the occupant device 132 of the occupant 134. For example, the monitoring server 130 can receive sensor data from the control unit 102, including image data captured by the camera 112 of the drone 110. The monitoring server 130 can also receive visitor schedules from the occupant 134, approvals or confirmations of upcoming visits from the occupant 134, one or more authorized areas of the property 150 for upcoming visits from the occupant 134, and/or one or more authorized times of the property 150 for upcoming visits from the occupant 134.

The monitoring server 130 can leverage one or more machine learning models to, for example, anticipate when the visitor 120 will enter the property, determine an authorized time that the visitor 120 can stay at the property, determine an authorized area of the property 150 that the visitor 120 can travel in, determine if the visitor is entering the property 150, determining if the visitor 120 is in the property 150, determining a location of the visitor 120 in the property, identifying the visitor 120 as the anticipated person (e.g., by comparing a previously obtained picture of the visitor 120 with images of the visitor 120 obtained from the camera 112 of the drone 110), etc.

The network 140 can include public and/or private networks and can include the Internet.

The occupant 134 can be an owner or manager of the property 150. The occupant 134 can be a user of the system 100, such as a user of the control unit 102 and/or the monitoring server 130.

The occupant device 132 can be, for example, a computing device such as a mobile phone, a smart phone, a tablet, a laptop computer, a desktop computer, etc.

In general, in-house services can refer to services provided at one or more properties. For example, in-house services can refer to services provided at one or more of apartments, apartment buildings, condominiums, duplexes, offices, office buildings, etc. In-house services can include, for example, package delivery services, food delivery services such a grocery delivery services (e.g., in refrigerator/freezer delivery services), cleaning services, repair services, care services such as child care or elder care services, etc.

The disclosed techniques can improve the protection of property in a number of ways. As in-house services rise in popularity, visitors are more frequently being given access to unattended homes which can present an increased risk of property theft and/or property damage. The described system can reduce the likelihood of property theft or damage by, for example, having a drone with a security camera monitor visitors when they enter the property, and using the drone to determine if a visitor has entered a part of the property that they are not authorized to access. If a visitor has entered an unauthorized area, the described system can notify service personnel and/or the property owner. Similarly, the described system can, for example, notify service personnel and/or the property owner if the visitor has stayed in the property past an authorized time. Accordingly, the described system can help keep better track of visitors and prevent visitors from entering areas of a property that may, for example, contain valuables or sensitive information.

The disclosed techniques can improve the safety for the occupants of a given property in a number of ways. For example, an owner of the property can monitor a live stream or stored video of the visit from the perspective of the drone. The owner of the property can use this image data to confirm that the person who arrived at the home was the anticipated visitor, to ensure that the visitor did not plant any items in the house such as cameras, to ensure that the visitor did not tamper with food, to ensure that the visitor did not steal any items such as medication, to ensure that the visitor performed the service they were hired to perform, etc.

The occupant device 132, the control unit 102, and/or the monitoring server 130 can send instructions to the drone 110, such as instructions indicating one or more actions for the drone 110 to perform and/or information that the drone 110 can use to determine one or more actions to perform. For example, the instructions can indicate one or more of a triggering event to start surveillance, to turn on (e.g., to perform pre-flight actions, to turn on one or more of its motors, and/or to take flight), a visitor schedule including an upcoming service visit, a start time for an upcoming visit, an authorized time for a service visit, an area of the property 150 that the visitor 120 is authorized to travel in, a type of service visit for an upcoming service visit (e.g., package delivery, grocery delivery, house cleaning, dry cleaning drop-off, kitchen sink repair, etc.), input from the occupant 134, input from the visitor 120, etc..

A triggering event can include one or more of, for example, a specific time (e.g., a time that the visitor 120 is anticipated to arrive), an access code (e.g., entered by the visitor 120 through the smart lock 116), activation of a sensor (e.g., the triggering of the magnetic door sensor 156 indicating that the door 154 has been opened and/or of a motion sensor in the property 150), manual input provided by the occupant 134 through a GUI of the occupant device 132 (e.g., through a web-site or mobile application).

The occupant device 132, the control unit 102, and/or the monitoring server 130 can also provide the drone 110 a starting point of the upcoming visit. This starting point can be provided as part of the instructions. The starting point can include, for example, an entrance to the property 150, such as the front door 154, that the visitor 120 is expected to the enter the property 150 through. When the drone 110 begins surveillance based on a triggering event, the drone 110 can use the starting point as initial point of interest. For example, the drone 110 can change its orientation, its elevation, the position of its camera 112, and/or the settings of its camera 112 to aim the camera 112 towards the starting point (e.g., the door 154) and/or to place the starting point in the field of view of the camera 112.

In some implementations, the control unit 102, the monitoring server 130, or the drone 110 updates an environment map of the property 150 to include an indication of the starting point. The drone 110 can refer to the environment map in navigating through the property 150.

The occupant device 132, the control unit 102, and/or the monitoring server 130 can also provide the drone 110 an authorized area of the property 150. The authorized area can be a zone in which the visitor 120 is permitted to travel in. The authorized area can be defined by one or more shapes, such as one or more closed polygons or one or more rounded shapes, corresponding to one or more areas of the property 150. The one or more shapes can be drawn on a floor plan of the property 150. The drone 110 can refer to the floor plan in navigating the property 150 and/or in monitoring the visitor 120 through the property 150. The authorized area can be automatically selected by the system 100 (e.g., the monitoring server 130) based on the type of visit. For example, the authorized area can be selected to include the kitchen 152 based on the visit being a grocery delivery.

The type of service visit can be, for example, specified by the occupant 134 through the occupant device 132, by the visitor 120, or by a service provider. Alternatively, the system 100, e.g., the monitoring server 130, can refer to lookup list or historical data to determine a type of service visit. In determining the type of service visit, the system 100, e.g., the monitoring server 130, can determine the type of service visit based on the service provider of the service visit and/or the visitor 120.

Types of service visits can include, for example, package delivery, food delivery such as grocery delivery, repair services, cleaning services, or care services. Each type of service can be associated to one or more particular areas of the property 150. For example, each type of service can be associated to one or more authorized areas of the property 150 that collectively make up an authorized area for the type of service to be performed. The particular areas can be determined based on one or more of selections made by the occupant 134 (e.g., area selections of a floor plan of the property 150 made through a mobile application running on the occupant device 132), locations that the service provider or the visitor 120 indicate that they need access to (e.g., the service provider can indicate that the visitor 120 needs access to the kitchen 152 to deliver groceries), locations that are associated with the type of service based on historical data (e.g., previously collected data from service visits at the property 150 or from other properties).

Using selections, e.g., selections made by one or more of the occupant 134, the service provider, the visitor 120, other visitors, other occupants, or other service providers, and/or historical data, the monitoring server 130 can generate a lookup list. The lookup list can associate each type of service visit to one or more authorized areas of the property 150. For example, based on receiving an indication that the service visit is a grocery delivery, the monitoring system 130 can refer to a lookup table, identify grocery delivery in the lookup table, and identify the kitchen 152 as an authorized area corresponding to the grocery delivery type of service visit.

The authorized area can be selected by the occupant 134 through the occupant device 132, e.g., through a mobile application running on the occupant device 132. For example, the mobile application can display a floor plan of the property 150 on the GUI of the occupant device 132. The occupant 134 can then draw one or more areas on the floor plan that serve as authorized areas of the property 150 for that visit, or for that type of visit. For example, the occupant 134 can set default authorized areas of the property 150 for each type of visit, for each visitor, for the time of day, etc. The visitor 120 can, in some implementations, request an expanded authorized area, e.g., through a mobile app of their device. The visitor 120 can be prompted to provide a reason for the request. For example, the visitor 120 can request an expanded authorized area and provide an explanation that they need to use a restroom of the property 150.

In some implementations, the drone 110 can determine an authorized area, e.g., based on one or more of data it receives from the control unit 102, the monitoring server 130, the occupant device 132, a device of the visitor 120, etc.

In some implementations, the control unit 102, the monitoring server 130, or the drone 110 updates an environment map of the property 150 to include an indication of the authorized area. The drone 110 can refer to the environment map in navigating through the property 150.

As an example, the authorized area can correspond to the kitchen 152 or to part of the kitchen 152, e.g., based on the visitor 120 delivering groceries. If the visitor 120 breaches the authorized area, e.g., travels beyond the kitchen 152, the control unit 102, the monitoring server 130, and/or the occupant device 132 can take additional actions. For example, the control unit 102 can generate a notification to send to the monitoring server 130 based on the drone 110 indicating that the visitor 120 has traveled beyond the authorized area. The control unit 102 can additionally trigger an alarm for the property 150, can lock one or more other doors of the property (e.g., bedroom doors), can turn on other monitoring devices such as cameras 158a-158b, etc. Based on the notification from the control unit 102, the monitoring server 130 can generate and send one or more notifications to an occupant device 132 of the occupant 134, can generate and send one or more notifications to service personnel, can contact emergency services (e.g., the police), can contact an employer of the visitor 120, can notify the visitor 120 to return to the authorized area or to leave the property 150, etc. Notifications sent to the occupant device 132 can include, for example, text messages, notifications received through a security application running on the occupant device 132, phone calls, etc.

In some implementations, the drone 110 can communicate with the occupant device 132, e.g., when a visitor breaches an authorized area of the property 150. The drone 110 can send notifications to the occupant device 132, can provide image data to the occupant device 132, can stream video to the occupant device 132, etc. when a visitor has breached an authorized area.

In some implementations, the drone 110 can communicate with service personnel, e.g., when a visitor breaches an authorized area of the property 150. The drone 110 can send notifications to devices of service personnel, can provide image data to devices of service personnel, can stream video to devices of service personnel, etc. when a visitor has breached an authorized area.

In some implementations, service personnel, emergency services, the occupant 134, and/or other occupants can be notified by an audio system deployed in the property 150, e.g., when a visitor breaches an authorized area of the property 150. For example, the drone 110 and/or the control unit 102 can use a virtual assistant in the property 150 (e.g., an Amazon Alexa) to notify service personnel, emergency services, the occupant 134, and/or other occupants when a visitor has breached an authorized area.

The occupant device 132, the control unit 102, and/or the monitoring server 130 can also provide the drone 110 an authorized time to visit the property 150. The authorized time can be the time period in which the visitor 120 is permitted to be in the property 150. The length of the authorized time can depend on the type of visit, e.g., delivering packages may be provided an authorized time of ten minutes whereas a repair visit may be provided an authorized time of one hour. The authorized time can be selected automatically by the system 100 (e.g., the monitoring server 130) based on the type of visit. The authorized time can be set by the occupant 134 through the occupant device 132, e.g., through a mobile app on the occupant device. The visitor 120 can, in some implementations, request additional time, e.g., through a mobile app of their device. The visitor 120 can be prompted to provide a reason for the request for additional time.

In some implementations, the drone 110 can determine an authorized time, e.g., based on one or more of data it receives from the control unit 102, the monitoring server 130, the occupant device 132, a device of the visitor 120, etc.

If the visitor 120 stays in the property 150 past the authorized time, e.g., stays in the property 150 more than fifteen minutes, the control unit 102, the monitoring server 130, and/or the occupant device 132 can take additional actions. For example, the control unit 102 can generate a notification to send to the monitoring server 130 based on the drone 110 indicating that the visitor 120 has stayed past the authorized time. The control unit 102 can additionally trigger an alarm for the property 150, can lock one or more other doors of the property (e.g., bedroom doors), can turn on other monitoring devices such as cameras 158a-158b, etc. Based on the notification from the control unit 102, the monitoring server 130 can generate and send one or more notifications to an occupant device 132 of the occupant 134, can generate and send one or more notifications to service personnel, can contact emergency services (e.g., the police), can contact an employer of the visitor 120, can notify the visitor 120 to leave the property 150, etc. Notifications sent to the occupant device 132 can include, for example, text messages, notifications received through a security application running on the occupant device 132, phone calls, etc.

In some implementations, the drone 110 can communicate with the occupant device 132, e.g., when a visitor stays in the property 150 past the authorized time. The drone 110 can send notifications to the occupant device 132, can provide image data to the occupant device 132, can stream video to the occupant device 132, etc. when a visitor has stayed past the authorized time.

In some implementations, the drone 110 can communicate with service personnel, e.g., when a visitor stays in the property 150 past the authorized time. The drone 110 can send notifications to devices of service personnel, can provide image data to devices of service personnel, can stream video to devices of service personnel, etc. when a visitor has stayed past the authorized time.

In some implementations, service personnel, emergency services, the occupant 134, and/or other occupants can be notified by an audio system deployed in the property 150, e.g., when a visitor stays in the property 150 past the authorized time. For example, the drone 110 and/or the control unit 102 can use a virtual assistant in the property 150 (e.g., an Amazon Alexa) to notify one or more of service personnel, emergency services, the occupant 134, or other occupants when a visitor has stayed past the authorized time.

In some implementations, the drone 110 is provided and/or is capable of accessing a visitation schedule. The visitation times recorded in the schedule can be used by the drone 110 as triggering events. The schedule can be updated over time, e.g., the schedule can be updated to account for new visits, cancelled visits, visitation requests by potential visitors, visitation confirmations by the occupant 134, etc. The schedule can be stored and/or maintained on the monitoring server 130, or on the occupant device 132. The visitation schedule can indicate, for example, whether a visit (e.g., a surveillance mission) is one-time, or reoccurring. The visitation schedule can indicate a start time and/or an end time.

In some implementations, some types of visits are associated with a particular area of the property 150. Accordingly, the control unit 102 and/or the drone 110 can determine an authorized area of the property 150 for the visitor 120 based on the type of visit. For example, as shown, the type of visit in the example of FIG. 1 is that of grocery delivery. Accordingly, the control unit 102 can send instructions to the drone 110 indicating that the type of visit is a grocery delivery visit. The drone 110 can determine, e.g., by leveraging one or more machine learning models or by referring to a lookup table, that the visitor 120 is only authorized to the kitchen 152, or part of the kitchen 152, of the property 150 based on the type of visit being a grocery delivery.

Similarly, in some implementations, some types of visits are associated with a time or a period of time. For example, the drone 110 can determine, that the visitor 120 is only permitted in the property 150 for a relatively short period of time (e.g., five minutes, ten minutes, or fifteen minutes). Once the authorized time has passed, a smart lock 116 of a front door 154 of the property 150 will be automatically locked, e.g., if the visitor 120 has left the property 150. However, if the visitor 120 fails to leave the property 150 in the authorized time, the control unit 102 and/or the monitoring server 130 can take additional actions. For example, the control unit 102 can generate a notification to send to the monitoring server 130 based on the drone 110 indicating that the visitor 120 is still in the property 150. The control unit 102 can additionally trigger an alarm for the property 150, can lock one or more other doors of the property (e.g., bedroom doors), can turn on other monitoring devices such as the cameras 158a-158b, etc.

Based on the notification from the control unit 102, the monitoring server 130 can generate and send one or more notifications to an occupant device 132 of the occupant 134, can generate and send one or more notifications to service personnel, can contact emergency services (e.g., the police), can contact an employer of the visitor 120, etc. Notifications sent to the occupant device 132 can include, for example, text messages, notifications received through a security application running on the occupant device 132, phone calls, etc.

The occupant device 132, the control unit 102, and/or the monitoring server 130 can also provide the drone 110 one or more temporary landing sites. A landing site can be a location in the property 150 where the drone 110 can land. A landing site can be in an authorized area of the property. A landing site can be near an authorized area of the property 150, e.g., within one foot of an authorized area, within one meter of an authorized area, within two meters of an authorized area, etc.

A landing site can selected by the occupant device 132, the control unit 102, and/or the monitoring server 130 so as to keep the visitor 120 in a field of view of the camera 112. The occupant device 132, the control unit 102, and/or the monitoring server 130 can provide the drone 110 a landing site based on a determination that the visitor 120 has stayed at or near one location for a threshold amount of time (e.g., five minutes, ten minutes, fifteen minutes, etc.).

The occupant device 132, the control unit 102, and/or the monitoring server 130 can provide the drone 110 a landing site based on a determination that the visitor 120 will likely stay at or near a location for threshold amount of time (e.g., one minute, five minutes, ten minutes, fifteen minutes, etc.). For example, if the visitor 120 is visiting to repair the kitchen sink, then the occupant device 132, the control unit 102, and/or the monitoring server 130 can determine that the visitor 120 will stay at or near a location corresponding to the kitchen sink. The occupant device 132, the control unit 102, and/or the monitoring server 130 can proceed to provide the drone 110 a landing site near the kitchen sink.

In some implementations, the drone 110 can determine one or more temporary landing sites, e.g., based on data it receives from the control unit 102, the monitoring server 130, the occupant device 132, and/or a device of the visitor 120. For example, the drone 110 can determine a landing location by comparing a received authorized area with an environment map for the property 150. In comparing the authorized area with the environment map for the property 150, the drone 110 can identify landing sites in or near the authorized area. The drone 110 can select a landing site in or near the authorized area that would keep the visitor 120 in a field of view of the camera 112, e.g., a landing site near the visitor 120. The drone 110 can choose to identify a landing site and/or land at a landing site based on the visitor 120 staying at or near one location for a threshold amount of time (e.g., five minutes, ten minutes, fifteen minutes, etc.). The drone 110 can choose to identify a landing site and/or land at a landing site based on a determination that the visitor 120 will likely stay at or near a location for a threshold amount of time (e.g., one minute, five minutes, ten minutes, fifteen minutes, etc.).

In some implementations, when a visit corresponds to longer services (e.g., services lasting more than ten minutes, more than thirty minutes, more than an hour, etc.), a new landing site can be chosen. For example, the occupant device 132, the control unit 102, and/or the monitoring server 130 can set the docking station 114 as a new landing site in order to recharge the drone 110. Alternatively, the drone 110 can automatically navigate to the docking station 114 if its battery charge level falls below a certain threshold.

The length, e.g., duration, of the service visit, or an expected length of the service visit, can be communicated to the system 100 (e.g., to the drone 110, the control unit 102, and/or the monitoring server 130) by one or more of the occupant 134 (e.g., through the occupant device 132), a service provider, or the visitor 120. For example, the service provider can send the monitoring server 130 an indication that the service visit is expected to take five minutes, seven minutes, ten minutes, or the like.

Alternatively, the length of the service visit can be estimated by the system 100 (e.g., to the drone 110, the control unit 102, and/or the monitoring server 130) by referring to a lookup table, by accessing and analyzing historical data, or a combination thereof. For example, the historical data can indicate that for the type of service visit (e.g., grocery delivery) and for the service provider (e.g., delivery service that hired the visitor 120 as an employee or contracted the visitor 120), that the average duration of the service visit is expected to be ten minutes.

Image data and/or audio data collected by the drone 110 during a surveillance session, e.g., during a visit, can be sent to the control unit 102, the monitoring server 130, and/or the occupant device 132 for storage thereon. For example, the image data and/or audio data, such as videos of each visit, can be stored on the monitoring server 130 and associated with the corresponding visit. The data can be stored for a temporary amount of time, e.g., one month, two months, six months, etc.

In some implementations, the occupant 134 can monitor the visitor 120 through the occupant device 132. For example, the occupant 134 can access a live stream of the image data captured by the camera 112 of the drone 110 and/or by the cameras 158a-158b through a mobile application running on the occupant device 132.

FIGS. 2A through 2F are diagrams showing an example process for in-house surveillance using a security camera drone.

Figure 2A:
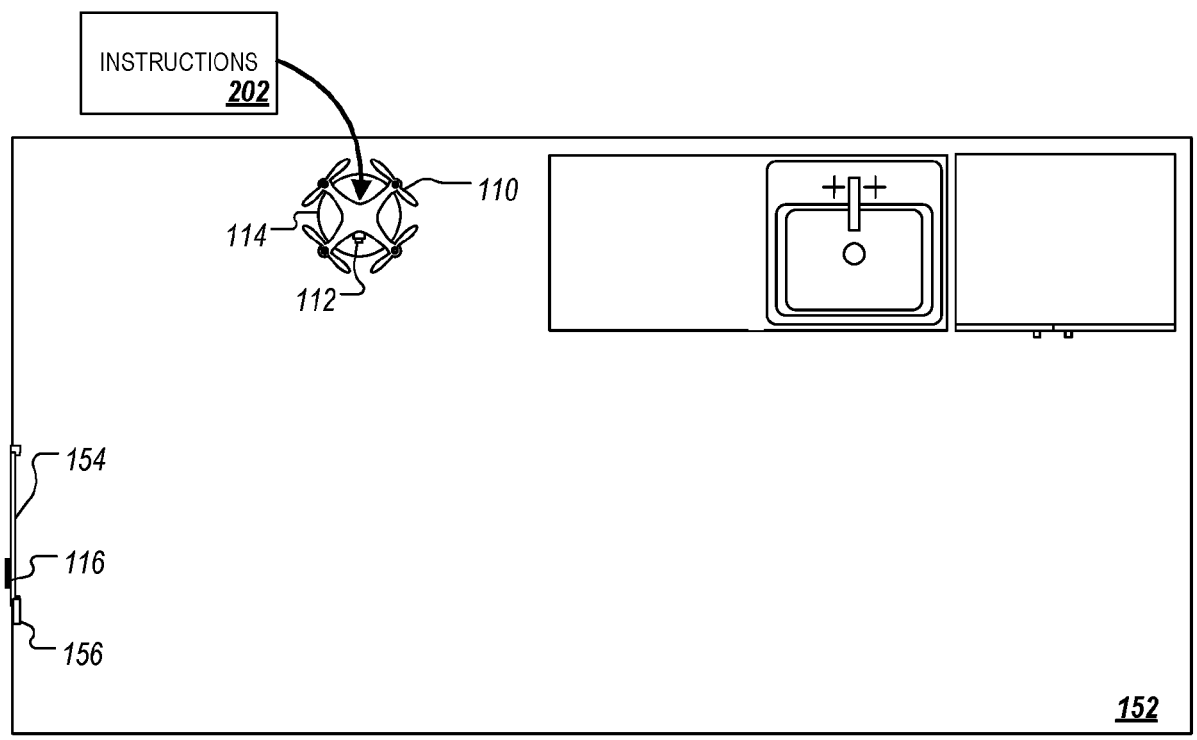
FIGS. 2A through 2F are diagrams showing an example process for in-house surveillance using a security camera drone.

In FIG. 2A, the drone 110 having the camera 112 is located on the docking station 114. The drone 110 receives instructions 202. The instructions 202 can be provided by the control unit 102, the monitoring server 130, and/or the occupant device 132. The instructions 202 can include a triggering event. For example, the instructions 202 can include one or more of a specific time that the visitor 120 is anticipated to arrive to deliver groceries, an access code entered by the visitor 120 through the smart lock 116, activation of a sensor (e.g., the triggering of the magnetic door sensor 156 indicating that the door 154 has been opened and/or of a motion sensor in the property 150), manual input provided by the occupant 134 through a GUI of the occupant device 132 (e.g., through a web-site or mobile application), etc. A surveillance session is started once the drone 110 receives a triggering event. As an example, here, the triggering event can be that the inclusion of an indication that an access code has been successfully entered through the smart lock 116 and/or that the smart lock 116 has been unlocked. Upon the start of the surveillance session and/or receiving the triggering event, the drone 110 can turn on its motors and take flight.

The instructions 202 can also include, for example, one or more of an indication of a starting point such as the door 154 (e.g., indicating a location where the visitor 120 is anticipated to enter the property 150 through), one or more authorized areas for the visitor 120, an authorized time for the visitor 120, an expected total time of the service visit, etc. As an example, a service provider (e.g., a company that hired the visitor 120, the visitor 120 if they are self-employed or are a contractor, etc.) can indicate an expected total time of the service visit. This can be communicated to the drone 110 as part of the instructions 202 through the monitoring server 130. As another example, a user such as the occupant 134 can indicate an expected total time of the service visit. This can be communicated to the drone 110 as part of the instructions 202 through the monitoring server 130 and/or the occupant device 132.

The drone 110 can determine an expected duration of the service visit, e.g., an expected total time of the service visit. For example, the drone 110 can access historical data for past service visits. The historical data can indicate, for example, one or more an average duration for all past service visits, an average duration for past service visits for the same type of service visit as the current service visit being provided by the visitor 120, an average duration for past service visits provided by the visitor 120, etc. The drone 110 can use this historical data to determine an expected duration of the service visit. Alternatively, the control unit 102 and/or the monitoring server 130 can determine an expected duration of the service visit, e.g., by accessing historical data for past service visits.

The drone 110 can use the expected duration of the service visit to, for example, determine whether the drone 110 will need to land during the service visit (e.g., to conserve batter charge levels), will need to recharge during the service visit (e.g., for particularly long services such as certain repair services or cleaning services), a number of landing sites, a location of one or more landing sites, etc. This is discussed in more detail below with respect to FIG. 2D.

In place of or in addition to the instructions 202, the drone 110 can receive data from the smart lock 116. For example, the drone 110 can receive an indication from the smart lock 116 that an access code has successfully been entered through the smart lock 116.

In place of or in addition to the instructions 202, the drone 110 can receive data from one or more sensors such as the magnetic door sensor 156. For example, the drone 110 can receive an indication from the magnetic door sensor 156 that an access code has successfully been entered through the smart lock 116.

In some implementations, the drone 110 determines a starting point and/or refers to a default starting point. For example, the front door 154 can be the default starting point for the property 150.

The drone 110 can keep track of a current duration of the service visit. The drone 110 can, for example, start a timer when it receives a triggering event such as an indication that an access code has been successfully entered through the smart lock 116. Alternatively, the drone 110 can start a time when it receives sensor data, such as sensor data 204 shown in FIG. 2C described below, indicating that the visitor 120 has entered the property 150.

The drone 110, the control unit 102, and/or the monitoring server 130 can determine that the visitor 120 has exceeded the authorized time when, for example, the current duration meets or exceeds the authorized time.

In some implementations, the authorized time is the expected duration of the service visit. For example, the authorized time can be the expected duration provided to the system 100 (e.g., provided to the drone 110, the control unit 102, and/or the monitoring server 130) by one or more of the occupant 134, a service provider of the service visit, or the visitor 120. As another example, the authorized time can be the expected duration of the visit determined by the system 100 (e.g., determined by the drone 110, the control unit 102, and/or the monitoring server 130) by one or more of referring to a lookup table, referring to historical data, or analyzing historical data.

In some implementations, the authorized time is calculated using the expected duration of the service visit. For example, the authorized time can be calculated by adding a time value to the expected duration, e.g., by adding two minutes, five minutes, or ten minutes to the expected duration. As another example, the authorized time can be calculated by multiplying the expected duration by a valued, e.g., by multiplying the expected duration by a value of 1.1, 1.2, or 1.3, etc. Accordingly, the authorized time can be larger than the expected duration. This can account for expected variations in service visit duration. If the visitor 120 needs additional time to complete the service, the visitor 120 can request more time, e.g., through a mobile application running on a visitor device. The visitor device can be a work device provided by the service provider.

Figure 2B:
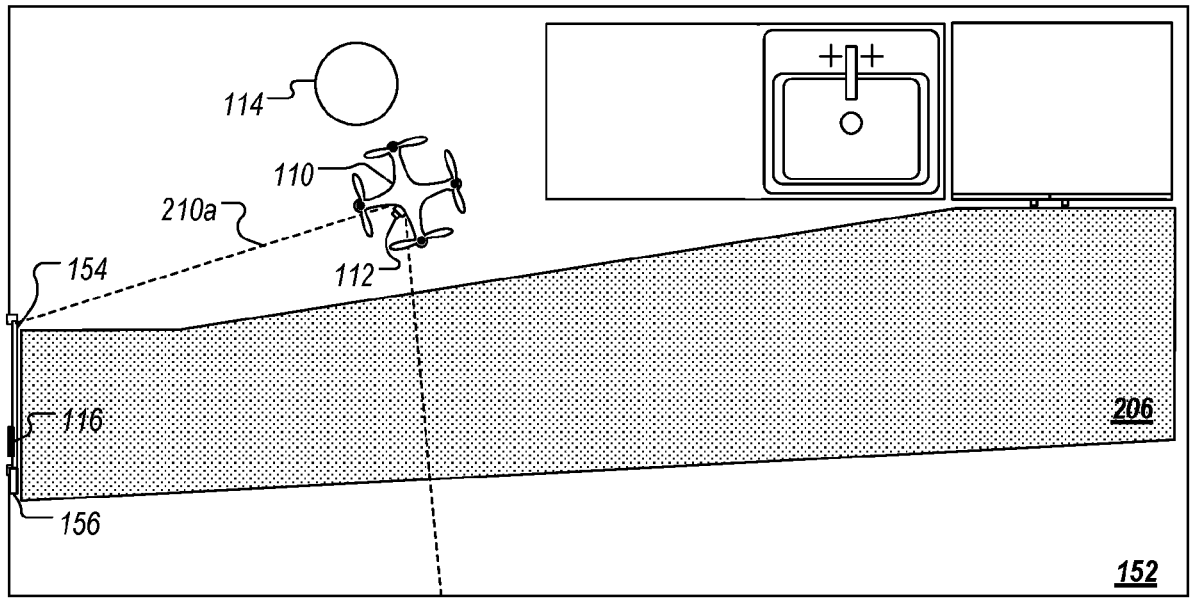

In FIG. 2B, the drone 110 positions itself near the starting point. The drone 110 can adjust one or more of its orientation, its elevation, the position of its camera 112, or the settings of its camera 112 in order to aim the camera 112 towards the starting point, e.g., the door 154, and/or to place the starting point in the field of view 210b of the camera 112.

The drone 110 also identifies an authorized area 206. The drone 110 can identify the authorized area 206 based on the instructions 202. For example, the instructions 202 may have included an indication of the authorized area 206 based on input provided by the occupant 134. Alternatively, the drone 110 may have determined the authorized area 206, e.g., based on one or more of the type of visit (grocery delivery) or where the kitchen 152 is located in the property 150.

In some implementations, the drone 110 can include a pre-configured visit (e.g., a preconfigured "in-house service") that is linked to the smart lock 116 and/or one or more other smart locks of the property 150. The drone 110 can communicate with the smart lock 116 in order to effectuate an action by the smart lock 116. For example, the drone 110 can instruct the smart lock 116 to delay or cancel the unlocking of the front door 154, e.g., if the drone 110 needs more time to get into the position shown in FIG. 2B, if the drone 110's battery charge level is too law to complete the surveillance, if the occupant 134 has cancelled or revoked the visit, etc.

The drone 110 can delay unlocking the smart lock 116 by, for example, sending a delay request message to the smart lock 116 and/or to a service provider of property, e.g., in-house, services while the drone 110 is preparing for surveillance. The drone 110 can prepare for surveillance by, for example, performing pre-flight checks, taking-off, positioning itself in front of the door 154 to start surveilling, etc.

After the drone 110 is in place and ready to start surveilling, the drone 110 can cause, message, or otherwise request the smart lock 116 to resume the unlocking of the door 154.

If the drone 110 encounters a problem during pre-flight checks or cannot take-off and/or perform the surveillance mission for any reason (e.g., due to batter failure, due to low battery charge levels, due to component failure, etc.), the drone 110 can cancel unlocking of the smart lock 116 by sending a cancel request to the smart lock.

In some implementations, an authorized area is not generated.

Figure 2C:
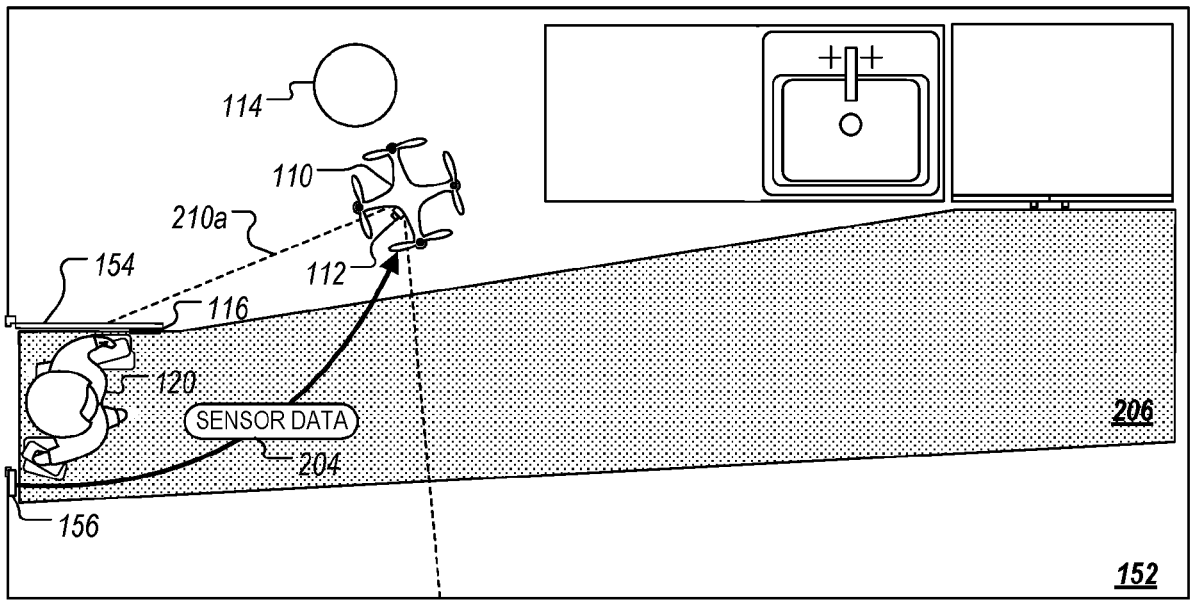

In FIG. 2C, the drone 110 receives sensor data 204. As shown, for example, the drone 110 receives the sensor data 204 from the magnetic door sensor 156. In some implementations, sensor data is first sent to the control unit 102. The control unit 102 can the send the sensor data or modified sensor data (e.g., normalized sensor data) to the drone 110. The sensor data 204 indicates that the front door 154 has been opened.

The drone 110 can use the sensor data 204 to determine that the visitor 120 is likely the person who opened the door 154. The drone 110 can make this determination based on one or more of the door 154 being opened within a threshold amount of time since an access code provided only to the visitor 120 was successfully entered through the smart lock 116 (e.g., within ten seconds of entering the access code, within thirty seconds of entering the access code, within one minute of entering the access code, etc.), or the door 154 being opened within a threshold amount of time from when the visit was scheduled to start (e.g., within one minute, three minutes, or seven minutes of scheduled start).

Once the visitor 120 starts to enter the property 150, the drone 110 beings to track the visitor 120. Tracking the visitor 120 can include keeping the visitor within the field of view 210a of the camera 112.

In some implementations, the drone 110 and/or the monitoring server 130 uses facial recognition to compare a face of the visitor 120 with a stored image of the visitor 120. For example, when registering on a mobile app, the visitor 120 may have been required to provide a security image. The drone 110 and/or the monitoring server 130 can compare images captured using the camera 112 with the security image to verify the identity of the visitor 120.

In some implementations, the drone 110 may wait for the door 154 to open before capturing image data, and/or performing other surveillance measures (e.g., performing pre-flight checks, determining one or more authorized areas, determining a landing site, sending captured image data, etc.).

In some implementations, the drone 110 determines that the visitor 120 is on their way to the start point, e.g., the door 154, and starts to capture image data and/or perform other surveillance measures (e.g., performing pre-flight checks, determining one or more authorized areas, determining a landing site, sending captured image data, etc.).

Figure 2D:
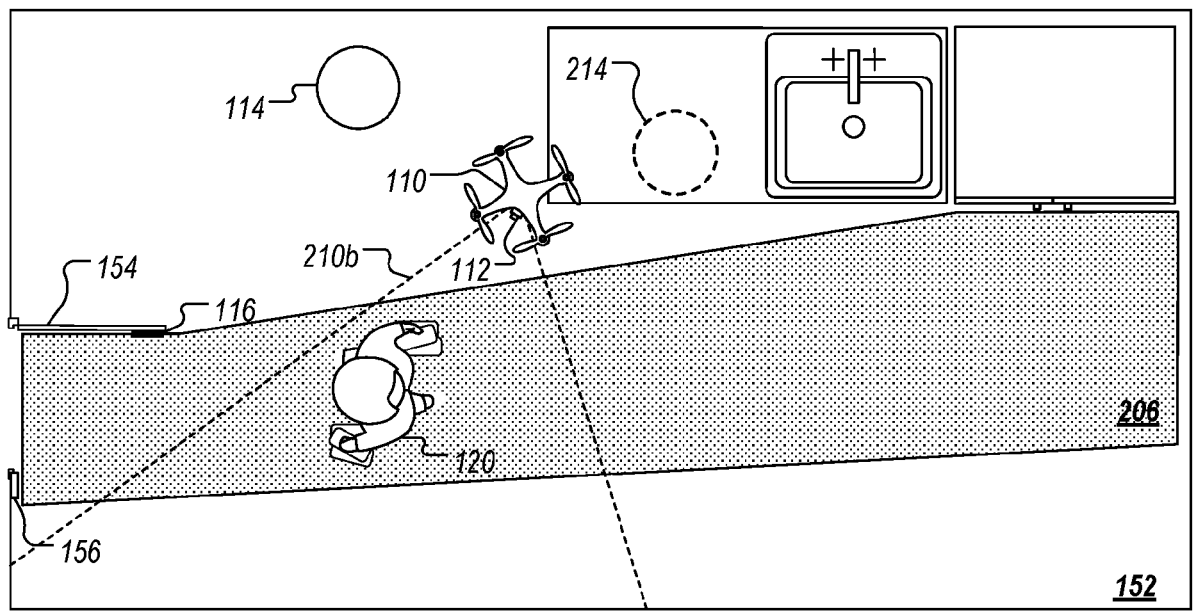

In FIG. 2D, the visitor 120 has started to walk towards the kitchen 152. As the visitor moves, the drone 110 repositions itself to keep the visitor 120 in the field of view 210b of the camera 112. Repositioning can include the drone 110 changing its orientation, its elevation, a position of the camera 112, and/or settings of the camera 112.

The drone 110 can identify a landing site 214. The landing site 214 can be in or near (e.g., one foot, one meter, two meters, etc.) the authorized area 206. The landing site 214 can be determined by the drone 110, e.g., based on determining that the visitor 120 is likely to stay at or near (e.g., within six inches, one foot, one meter, etc.) a particular location for a threshold amount of time (e.g., one minute, five minutes, ten minutes, etc.). For example, the drone 110 can determine, based on the instructions 202, that the visitor 120 is delivering groceries. The drone 110 can determine, e.g., by referring to a lookup table, that because the visitor 120 is delivering groceries they are likely to stay at or near the kitchen 152 or a particular part of the kitchen 152 (e.g., in front of the refrigerator in which some/all of the groceries will be placed). Based on this identified location of the visitor 120, the drone 110 can determine the landing site 214 based on it being in or near the authorized area 206, based on it being near the identified location where the visitor 120 is likely to be located for a threshold period of time, and/or based on it have a vantage point that allows the visitor 120 to remain in the field of view 210 of the camera 112.

In identifying the landing site 214, the drone 110 can take into account one or more of its remaining battery charge level, the current location of the visitor 120, an anticipated location of the visitor 120 (e.g., the kitchen 152, next to the refrigerator of the kitchen 152, etc.), a field of view of the camera 112 at one or more candidate locations (e.g., the landing site 214 and the docking station 114), a current duration of the visit, an expected total duration of the visit, etc.

As an example, if the battery charge level of the drone 110 is above a first threshold (e.g., above 60%, 70%, or 80%), then the drone 110 can choose to stay in flight instead of landing. The first threshold can be determined by the drone 110, e.g., based on the drone 110 comparing the remaining flight time with an expected total duration time of the visit/service. The first threshold can be provided to the drone 110 by the control unit 102, the monitoring server 130, or the occupant device 132, e.g., as part of the instructions 202.

As an example, if the battery charge level of the drone 110 is above a first threshold (e.g., above 60%, 70%, or 80%) and if the expected total or remaining duration of the visit is less than a second threshold (e.g., five minutes, seven minutes, or ten minutes), then the drone 110 can choose to stay in flight instead of landing. The first threshold and the second threshold can be determined by the drone 110, e.g., based on flight time The first threshold and second threshold can be provided to the drone 110 by the control unit 102, the monitoring server 130, or the occupant device 132, e.g., as part of the instructions 202. The second threshold can be determined based on the current battery charge level of the drone 110. For example, the second threshold can be the remaining flight time of the drone 110, or a minimum remaining flight time of the drone 110. The second threshold can be determined based on the first threshold. For example, the a first threshold of 60% battery charge level can indicate a second threshold of five minutes if the minimum flight time of the drone 110 with a battery charge level of 60% is five minutes.

As an example, if the battery charge level of the drone 110 is below a first threshold (e.g., above 60%, 70%, or 80%) and/or if the expected total or remaining duration of the visit is greater than a second threshold (e.g., five minutes, seven minutes, or ten minutes), then the drone 110 can choose to land. The drone 110 can select the landing site 214 over other candidate landing sites, such as the docking station 114, based on one or more of the proximity of the landing site 214 to a current location of the visitor 120, the proximity of the landing site 214 to an expected location of the visitor (e.g., a location where the visitor is expected to provide service or otherwise remain at for a threshold period of time), the proximity of the landing site 214 to the authorized area 206, the field of view 210 of the camera 112 at the landing site 214 (e.g., whether the visitor 120 will be in the field of view 210 of the camera 112 at the landing site 214), the elevation of the landing site 214 (e.g., vantage point will likely be superior if the landing site 214 is higher up), the remaining battery charge level of the drone 110 (e.g., the drone 110 can compare the remaining battery charge level to a third threshold lower than the first threshold), the expected total or remaining duration of the visit (e.g., the drone 110 can compare the expected total or remaining duration of the visit to a fourth threshold higher than the second threshold), etc.

For example, the drone 110 can select the landing site 214 over the docking station 114 after comparing the remaining battery charge level to a third threshold (e.g., 20%, 30%, or 40%) and determining that the remaining battery charge level is greater than the third threshold. The drone 110 can also determine that the vantage point of the landing site 214 is superior to the vantage point at the docking station 114. For example, the drone 110 can determine that it can keep the entirety of the visitor 120 in the field of view 210 of the camera 112 at the landing site 214, but not at the docking station 114 (e.g., kitchen countertop might block some or all of the drone 110's view, elevation at the docking station 114 might too low to keep all or most of the visitor 120 in the field of view 210 of the camera 112, or a combination thereof).

As another example, the drone 110 can select the docking station 114 over the landing site 214 after comparing the remaining battery charge level to a third threshold (e.g., 20%, 30%, or 40%) and determining that the remaining battery charge level is less than the third threshold. This can occur if, for example, the service visit goes longer than expected. This can occur in the case of long service visits such as, for example, certain repair services and cleaning services. In these cases, the drone 110 can select the docking station 114 over the landing site 214 despite the landing site 214 having a superior vantage point.

The landing site 214 can be determined by the control unit 102, the monitoring server 130, and/or the occupant device 132, e.g., based on determining that the visitor 120 is likely to stay at or near (e.g., within six inches, one foot, one meter, etc.) a particular location for a threshold amount of time (e.g., one minute, five minutes, ten minutes, etc.). The landing site 214 may have been communicated to the drone 110 as part of the instructions 202 or as part of a different set of instructions. As an example, the occupant 134 can select the landing site 214 through a mobile application running on the occupant device 132.

Figure 2E:
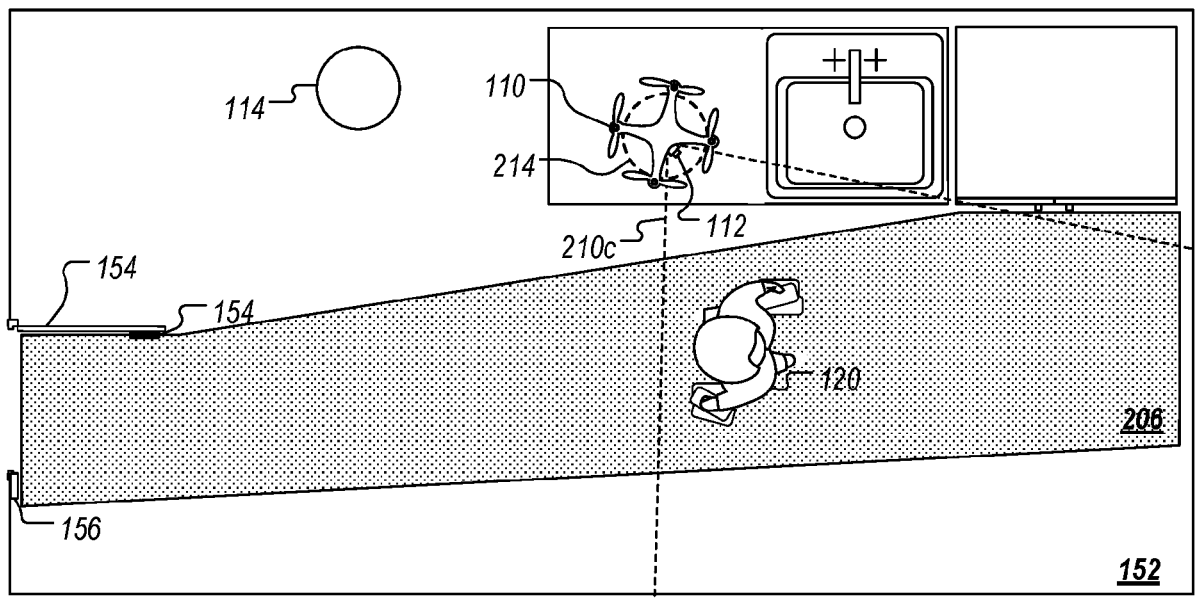

In FIG. 2E, the drone 110 has landed at the landing site 214. Prior to landing, the drone 110 positioned itself such that the visitor 120 falls within a field of view 210c of the camera 112 and/or that the visitor 120 is anticipated to fall within a field of view 210c when they reach a location that they are anticipated to stay at or near. For example, as shown, the position of the drone 110 is such that the field of view 210c of the camera 112 includes the majority of the authorized area 206 corresponding to the kitchen 152.

Figure 2F:
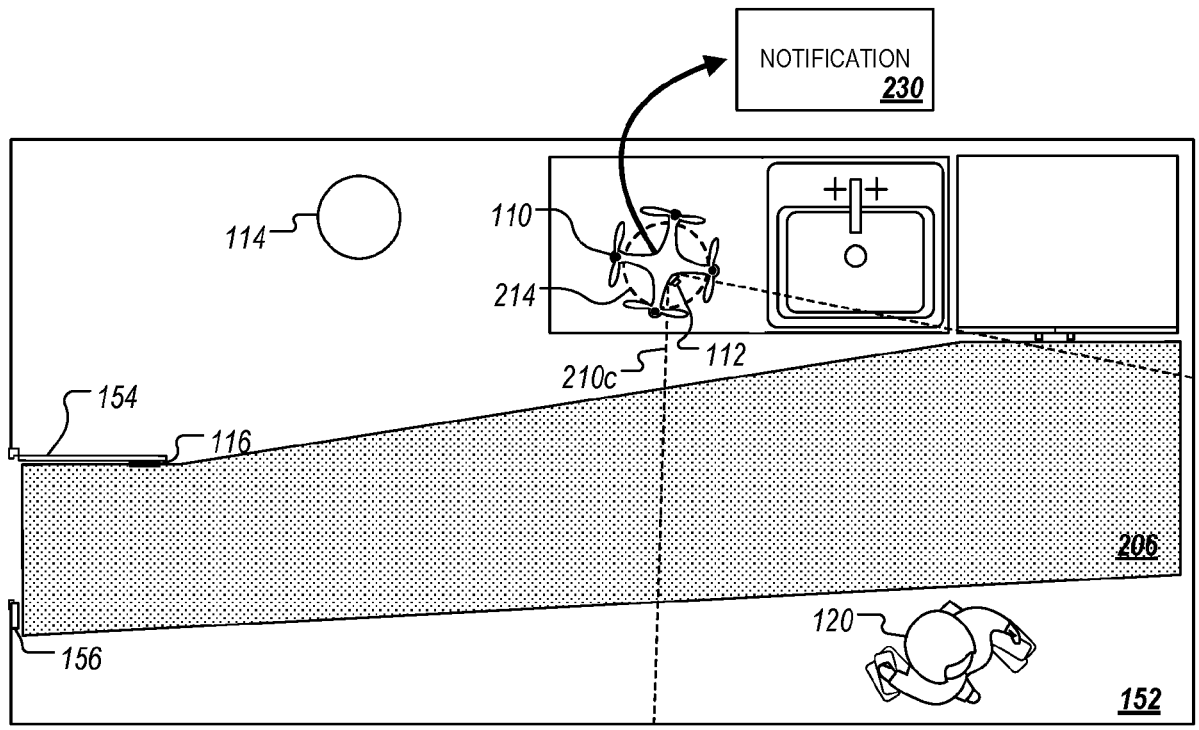

In FIG. 2F, the drone 110 determines that the visitor 120 has left the authorized area 206. In response to determining that visitor 120 has left the authorized area 206, the drone 110 can perform one or more actions. For example, the drone 110 can generate a notification 230. The notification 230 can be one or more of a notification to the control unit 102 to trigger an alarm for the property 150, a notification to the control unit 102 and/or the monitoring server 130 to trigger an alert for the property 150, a notification to the occupant device 132 to notify the occupant 134 that the visitor 120 has breached the authorized area 206, a notification to a visitor device of the visitor 120 to warn the visitor 120 to return to the authorized area 206, etc.

In some implementations, the visitor 120 has a set amount of time to return to the authorized area 206 before any alarm or alert is sent, or before the notification 230 or sent. For example, the visitor 120 can receive a warning through a mobile application running on their visitor device indicating that they have either ten seconds, thirty seconds, or one minute to return to the authorized area 206. The warning may have been sent by the monitoring server 130 to the visitor device in response to receiving the notification 230. Alternatively, the warning may have been generated by the visitor device itself detecting that the visitor 120 breached the authorized area 206. The visitor 120 may receive a notification once they return to the authorized area 206 indicating that they are back in the authorized area 206.

In some implementations, the drone 110 can use sensor data from other sensors to determine if the visitor 120 is in the authorized area 206. For example, the drone 110 can receive and use image data from the cameras 158a-158b in determining if the visitor 120 is within the authorized area 206, or if the visitor 120 has breached the authorized area 206.

Figure 3:
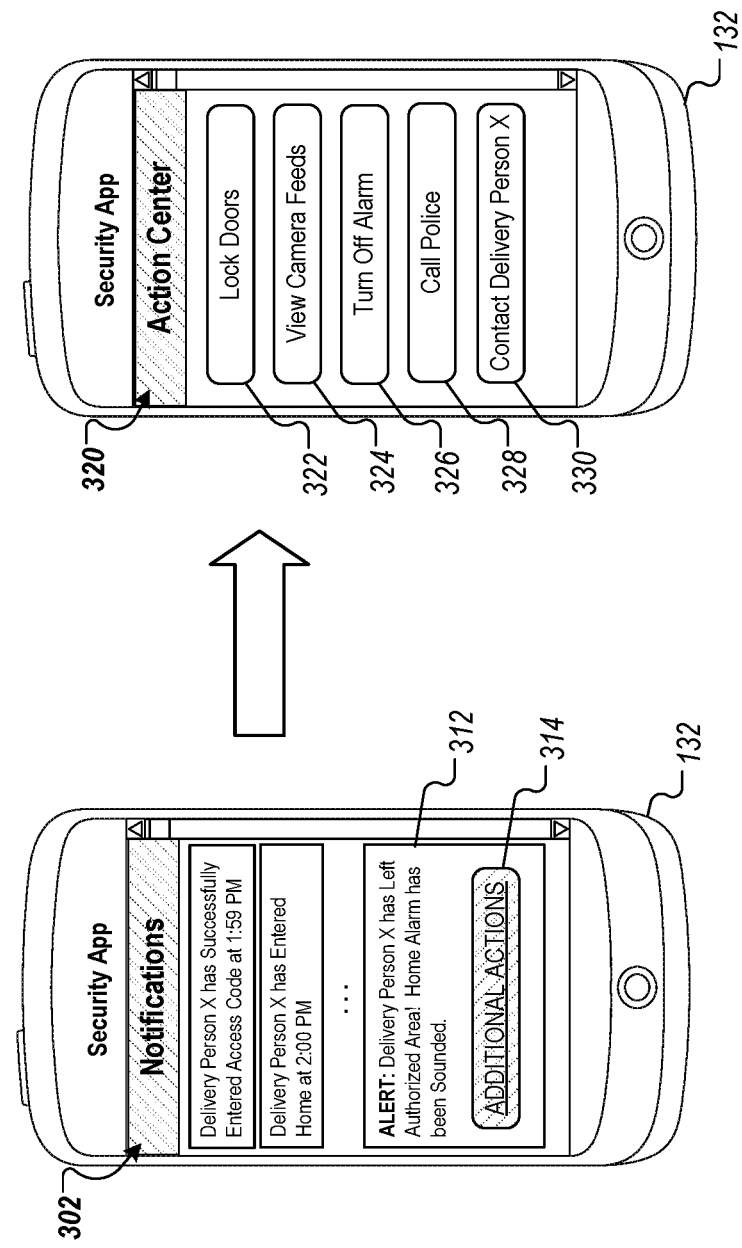
FIG. 3 is a diagram showing example interfaces for interacting with a security monitoring system.

FIG. 3 is a diagram showing example interfaces for interacting with a security monitoring system.

As shown, an interface 302 is displayed on a security mobile application running on the occupant device 132. The interface 302 displays security notifications the occupant 134 has recently received. These notifications can include, for example, an request to visit from a potential visitor, a confirmation indicating that a potential visitor has confirmed a visit, an indication that a visitor has successfully entered an access code, an indication that someone attempted to enter an access code but failed, an indication that a visitor has entered the property 150, an indication that a visitor failed to show, an indication that the visitor breached an authorized area of the property 150, an indication that the visitor stayed in the property past an authorized time, an indication of one or more actions taken by the security system 100 (e.g., alerts, alarms, doors locked, etc.), etc.

Here, the interface 302 includes a notification 312 indicating that the visitor 120 breached the authorized area 206 and that an alarm for the property 150 has been triggered. The notification 312 can be the notification 230 shown in FIG. 2. The notification 312 can correspond to the notification 230. The interface 302 provides an interface element 314 that has been activated by the occupant 134.

In response to activating the interface element 314, an interface 320 is presented on the display of the occupant device 132. The interface 320 corresponds to an action center. The interface 320 includes various interface elements 322-330 that the occupant 134 can activate. The occupant 134 can activate one or more of the interface elements 322-330. Each of the interface elements 322-330 correspond to an action that can be performed. For example, if the occupant 134 selects the interface element 322, all doors of the property 150 having smart locks would be locked, e.g., if the visitor 120 has already left the property 150. As another example, if the occupant 134 selects the interface element 322, all doors of the property 150 having smart locks would be locked except for the door 154, e.g., if the visitor 120 has not left the property 150.

If the occupant 134 selects the interface element 324, the occupant 134 can be presented image data collected by one or more of the sensors 104 of the system 100. As an example, if the occupant 134 selects the interface element 324, the occupant 134 can be brought to an interface where he is presented live feeds from one or more of the camera 112 of the drone 110, the camera 158a, or the camera 158b.

If the occupant 134 selects the interface element 326, the occupant 134 can turn off an alarm if it has been triggered. Accordingly, the occupant 134 can choose to ignore that the visitor 120 has breached the authorized area 206.

If the occupant 134 selects the interface element 328, the occupant 134 can contact or notify emergency services such as the police.

If the occupant 134 selects the interface element 330, the occupant can contact the visitor 120. Contacting the visitor 120 can include messaging such as text messaging, a voice call, a video call, etc.

Figure 4:
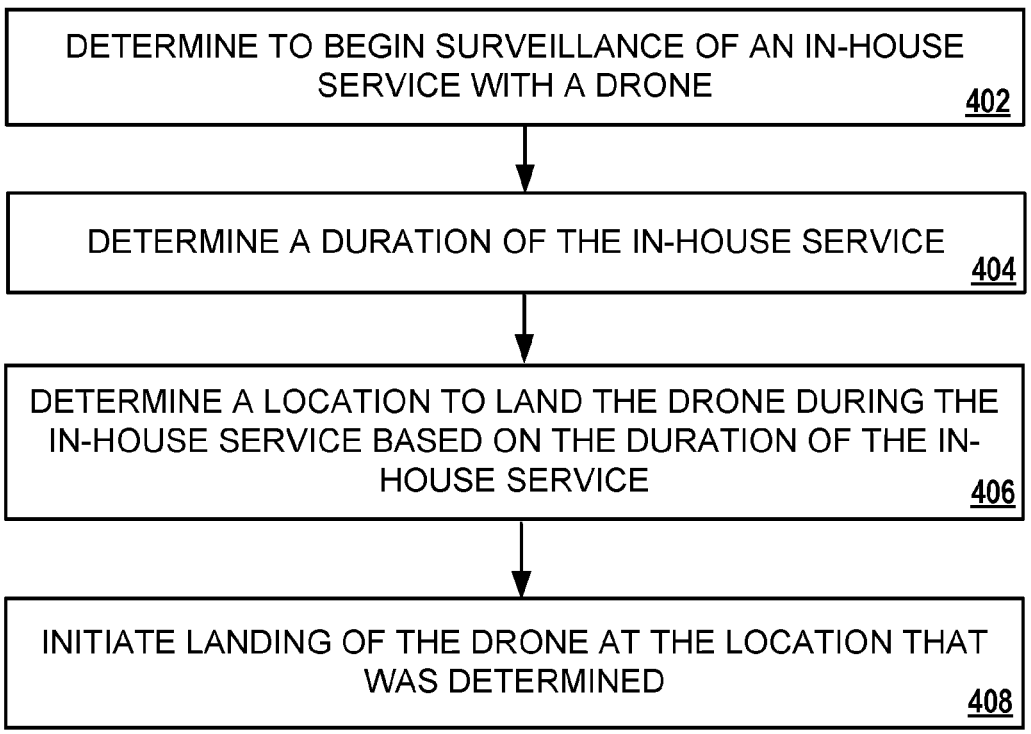
FIG. 4 is a flowchart of an example process for in-house surveillance using a security camera drone.

FIG. 4 is a flowchart of an example process 400 for in-house surveillance using a security camera drone. The process 400 can be performed, at least in part, using the system 100 described in FIG. 1, or the home monitoring system 500 described in FIG. 5. For example, the process 400 can be entirely performed by the control unit 102. Alternatively, the process 400 can be entirely performed by the monitoring server 130. Similarly, the process 400 can be entirely performed by the drone 110. The process 400 can also be performed by a combination of two or more of the drone 110, the control unit 102, and the monitoring server 130.

The process 400 includes determining to begin surveillance of an in-house service with a drone (402). The drone can include a security camera, such as a visible light camera.

With respect to FIG. 1, the drone can be the drone 110 having the onboard camera 112. The drone 110 can use the camera 112 to navigate through the property 150. The drone can determine to begin surveillance based on detecting or receiving a triggering event.

As an example, with respect to FIG. 1, a triggering event can include receiving an indication of an upcoming service visit from the control unit 102, the monitoring server 130, and/or the occupant device 132. As another example, the triggering event can be receiving an indication that an access code has successfully been entered through the smart lock 116. The triggering event can be a determination that the visitor 120 is approaching or entering the property, e.g., based on sensor data such as one or more of sensor data from the magnetic door sensor 156, image data from the camera 112, image data from the cameras 158a-158b, etc. With respect to FIG. 2A, the triggering event can be or can be part of the instructions 202.

In some cases the process 400 optionally includes receiving an indication of a scheduled start time of the in-house service. For example, with respect to FIG. 2A, the drone 110 can receive an indication of a scheduled start time as part of the instructions 202. The start time can be scheduled by, for example, a user such as the occupant 134 through a mobile application running on the occupant device 132, by a service provider of the in-house service, by the person to provide/perform the in-house service, etc.

Determining to begin surveillance can include determining to begin surveillance at the scheduled start time. For example, with respect to FIG. 2A, as a result of receiving the instructions 202 containing the scheduled start time, the drone 110 can take flight and positioning itself so that its view includes the expected start point, e.g., the front door 154 of the property 150.

In some cases the process 400 optionally includes receiving sensor data indicating an arrival of a service provider to perform the in-house service. For example, with respect to FIGS. 2A-2C, the drone 110 can receive sensor data from the smart lock 116 of the door 154. The sensor data can indicate, for example, that the visitor 120 has successfully entered an access code through the keypad of the smart lock 116. The sensor data can be sent directly to the drone from the sensor, e.g., directly to the drone 110 from the smart lock 116. The sensor data can be sent indirectly to the drone, e.g., through the control unit 102 or the monitoring server 130 as part of the instructions 202. The sensor data indicating an arrival can also include, in some implementations, sensor data indicating that the visitor 120 has entered the property 150. For example, the sensor data can be the sensor data 204 provided by the magnetic door sensor 156.

Determining to begin surveillance can include determining to begin surveillance in response to receiving the sensor data. For example, as a result of receiving sensor data from the smart lock 116 indicating that a person has successfully entered an access code, the drone 110 can take flight and positioning itself so that its view includes the expected start point, e.g., the front door 154 of the property 150.

In some cases, receiving the sensor data includes receiving sensor data from a smart lock device (e.g., the smart lock 116) indicating that a valid access code has been entered through the smart lock device, sensor data from a magnetic sensor (e.g., the magnetic door sensor 156) indicating that a door of a property where the in-house service is to take place has been opened, or sensor data from a motion detector indicating the detection of motion at a property where the in-house service is to take place.

In some cases, the process 400 optionally includes, in response to determining to begin surveillance of the in-house service, initiating positioning of the drone so as to place an entrance in a view of the drone. Initiating positioning of the drone can be due to the drone receiving or detecting a triggering event. For example, with respect to FIG. 2A, positioning of the drone 110 can be initiated based on the drone 110 receiving the instructions 202. The entrance is of a property where the in-house service is to take place. For example, the entrance can be the door 154 of the property 150.

In some cases, the process 400 optionally includes, receiving sensor data from a smart lock device of the entrance indicating that a valid access code has been entered through the smart lock device, determining that the drone has not completed positioning, and sending instructions to the smart lock device to delay or cancel unlocking of the smart lock device. For example, with respect to FIGS. 2A-2B, the smart lock device can be the smart lock 116. The drone 110 can receive an indication that access code has been successfully been entered through the smart lock 116 as part of the instructions 202. If the drone 110 is not yet in the correct position, e.g., if it has not yet taken flight and/or the door 154 is not yet in the field of view 210 of its camera 112, the drone 110 can send instructions to the smart lock 116 to delay or cancel unlocking of the smart lock 116 to keep the door 154 locked. Alternatively, the control unit 102 and/or the monitoring server 130 can send instructions to the smart lock 116 to delay or cancel unlocking of the smart lock 116 to keep the door 154 locked.

The delay can be a set time delay, such as a delay of one second, five seconds, or ten seconds. The set time delay can be predetermined, or can be based on a current position of the drone 110 (e.g., indicating how close the drone 110 is to completing positing). The delay can be a delay until the smart lock 116 receives an indication that the drone 110 has completed positioning such that the door 154 is in the field of view 210 of the camera 112.

Alternatively, the smart lock 116 can decide itself to delay or cancel the unlocking of the smart lock. For example, the smart lock 116 can be programed to delay unlocking of the door 154 for a predetermined amount of time when it detects that a visitor access code (e.g., as opposed to an occupant access code) is entered. For example, the smart lock 116 can be programmed to delay unlocking of the door 154 for five seconds, ten seconds, thirty seconds, etc. As another example, the smart lock 116 can decide to delay unlocking of the door 154 if the smart lock 116 has not yet received an indication that the drone 110 is in position so as to place a starting point, such as the door 154 of the property 154, in the field of view 210 of the camera 112. The indication can be provided by the drone 110, the control unit 102, and/or the monitoring server 130, e.g., as part of a notification.

The process 400 includes determining a duration of the in-house service (404). The duration can be an expected total duration for the in-house service. An expected total duration can be determined by one or more of referring to a lookup table for the type of service, receiving an expected total duration from a service provider or from a user such as an occupant of the property, referring to and/or analyzing historical data, etc. The historical data can indicate one or more of an average total duration for all service visits, an average total duration for service visits that are of the same type as the in-house service, an average total duration for service visits that are provided by the same service provider as the in-house service, an average total duration for service visits that are provided by the same person that is providing the in-house service, etc.

The duration can be a current duration of the in-house service, e.g., the amount of time that has allotted since the in-house service began. Here, the duration can be the difference between a start time of the in-house service and a current time. The start time of the in-house service can be the scheduled start time of the in-house service, a time when the person to provide the in-house service has arrived, or a time when the person to provide the in-house service has entered the corresponding property. With respect to FIG. 1, the arrival time can be the time when the visitor 120 successfully enters an access code through the smart lock 116. A time when the visitor 120 enters the property can be determined using one or more of the magnetic door sensor 156, the camera 112 of the drone 110, a motion sensor of the property 150, the cameras 158a-158b, etc.

In some cases, determining a duration of the in-house service includes estimating a total time of the in-house service. Estimating a total time of the in-house services can include estimating a total time based on one or more of the type of service being provided (e.g., package deliveries will be relatively short, whereas repair and cleaning services can be much longer in time), the service provider, the actual person providing/performing the in-house service, based on a layout of the property, a size of the property, input provided by a user such as an occupant of the property, input provided by a service provider, based on historical data, etc.

The process 400 can optionally include receiving an indication of a type of in-house service. Here, estimating a total time can include using the type of in-house service to estimate the total time of the in-house service. For example, with respect to FIGS. 2A-2F, the monitoring server 130 can estimate a total time of ten minutes based on, or based in part on, determining that the in-house service to be provided by the visitor 120 is to deliver groceries.

The process 400 can optionally include receiving an indication of an identity of a service provider or a person to perform the in-house service. Here, estimating a total time can include using the identity of the service provider or the person to estimate the total time of the in-house service. For example, with respect to FIG. 1, the monitoring server 130 can refer to stored historical data to determine that the service provider provides this type of in-house service in an average of eight minutes. Additionally or alternatively, the monitoring server can refer to stored historical data to determine that the actual person to perform the in-house service averages nine minutes for this type of in-house services, e.g., delivering groceries.

In some cases, determining a duration of the in-house service includes receiving an indication of an approximate total time of the in-house service from a user. For example, with respect to FIG. 2A, the drone 110 can receive an indication of the total time as part of the instructions 202. The indication of the total time can be provided by the service provider, by a user such as the occupant 134, by the monitoring server 130 (e.g., using a lookup table or historical data to estimate a total time).

In some cases, determining a duration of the in-house service includes determining a start time of the in-house service and a current time. The duration of the in-house services can be the difference between the start time and the current time. The start time can be a scheduled start time of the in-house services, an arrival time of a person to provide the in-house services, or a time when a person to provide the in-house service enters the corresponding property.

In some implementations, historical data of in-house services is provided as input to one or more machine learning models. The historical data can be collected over one or more of the current property (e.g., the property 150), multiple properties, multiple service providers, the person providing/performing the service (e.g., the visitor 120), multiple persons providing/performing the in-house services, etc. The one or more machine learning models can be initially trained using historical data collected from other properties. The one or more machine learning models can be subsequently trained using, or only using, data collected on in-house services performed at the corresponding property. This data can include one or more of, for example, the type of in-house service provided, the identity of the person providing/performing the in-house service, the service provider of the in-house service, a duration of the service visits, a size of the property, etc. The output of the one or more machine learning models can indicate an expected total duration time for the in-house visit, e.g., based on the in-house visit being a delivery service, being a grocery delivery service, based on the person providing/performing the in-house service, etc.

The process 400 includes determining a location to land the drone during the in-house service based on the duration of the in-house service (406). Determining a location to land the drone can include selecting a location from one or more candidate locations. For example, with respect to FIG. 2D, determining landing site 214 to land at can include selecting between landing at the landing site 214 and the docking station 114.

In determining a location, the drone 110, the control unit 102, and/or the monitoring server 130 can take into account one or more of the current battery charge level of the drone 110, the expected total duration of the in-house service visit, the current duration of the in-house service visit, the proximity of the candidate locations to a current location of the visitor 120 providing the in-house service, the proximity of the candidate locations to an anticipated location of the visitor 120 providing the in-house service (e.g., a location where the visitor 120 is anticipated to stay at or near for more than threshold amount of time), the proximity of the candidate locations to a boundary that the visitor 120 is not permitted to breach, the vantage point of the drone 110 at the candidate locations (e.g., whether drone 110 can keep all or a majority of the visitor 120 in the field of view 210 of the camera 112 at the location), the in-house service being provided (e.g., the visitor 120 delivering groceries indicates that locations near the kitchen 152 will likely be superior landing sites), etc.

In some cases, determining a location to land the drone includes determining that the power level is below a threshold power level. A power level can be a battery charge level. For example, with respect to FIG. 2D, the drone 110 can start searching for and/or analyzing candidate landing sites, including the landing site 214, in response to detecting that its current battery charge level is below a threshold of 55%.

Similarly, in some cases, the process 400 optionally includes determining that a power level of the drone is below a threshold power level. Here, determining the location to land the drone can include determining a charging location to land the drone. The charging location can be, for example with respect to FIG. 1, the docking station 114.

In some cases, determining the location to land the drone includes determining a location based on determining that the duration of the in-house service satisfies a duration threshold. The duration can be an expected total duration of the in-house service. For example, with respect to FIG. 2C, the instructions 202 can indicate a total expected time of the service visit that is greater than a threshold time of ten minutes. Based on this, the drone 110 can determine that it will need to land one time to conserve energy and does not anticipate needing to land at the docking station 114. The drone 110 can proceed to identify and/or analyze candidate landing sites including the landing site 214 shown in FIG. 2D. The duration can be a current duration of the in-house service.

In some cases, determining the location to land the drone includes determining a location based on candidate locations specified for the in-house service. For example, with respect to FIG. 2D, the landing site 214 can be a pre-selected candidate location for services that are to be performed in the kitchen 152. These pre-selected locations can be stored on the monitoring server 130, on the control unit 102, and/or on the drone 110. The pre-selected locations can be selected by a user such as the occupant 134 through the occupant device 132. For example, the occupant 134 can indicate a location through a GUI of the occupant device 132 displaying a floor plan of the property 150 including the kitchen 152.

In some cases, determining the location to land the drone also includes determining a location based on one or more of a current location of the drone, a current location of a person providing the in-house service, or the drone's view of a person providing the in-house service. With respect to FIG. 2B, the drone's view can include the field of view 210 of the drone 110's onboard camera 112.

In some cases, determining the location to land the drone includes determining whether to land at a charging location or a non-charging location based on at least one of the remaining power of the drone, an anticipated view of the drone at the charging location, an anticipated view of the drone at the non-charging location, a current location of a person providing the in-house service, or an anticipated location of a person providing the in-house service. A charging location can be, for example with respect to FIG. 2D, the docking station 114. A charging location can be used by the drone to replenish its power level, e.g., the level of charge of an onboard lithium-ion battery. A non-charging location can be, for example with respect to FIG. 2D, the landing site 214. A non-charging location can be used by the drone to conserve its power level.

The process 400 includes initiating landing of the drone at the location that was determined (408). Once landing has been initiated, the drone can begin navigating to the determined landing location. While navigating to the determined landing location, the drone can orient (e.g., multiple time throughout the navigation) itself so as to keep the person providing the in-house service in its view. For example, with respect to FIGS. 2D-2E, the drone 110 can keep the visitor 120 in the field of view 210 of its onboard camera 112 as it navigates to the landing site 214.

In some cases, the process 400 optionally includes, receiving data indicating a boundary that a person to provide the in-house service is authorized to travel in, obtaining sensor data, and, based on the sensor data, determining that the person has breached the boundary. For example, with respect to FIG. 2B, the boundary can be defined by the authorized area 206, e.g., the area that the visitor 120 is permitted to travel within. The sensor data can include image data obtained through the camera 112 of the drone 110, image data obtained from the camera 158a, image data obtained from the camera 158b, motion detector data, magnetic sensor data (e.g., magnetic door sensors and/or magnetic window sensors), etc.

In some cases, the process 400 optionally includes, in response to determining that the person has breached the boundary, notifying at least one of a service provider, a user, or the person that the boundary has been breached. The notification can be, for example, a text message, a notification through a mobile application, a voice call, a video call, etc.

Figure 5:
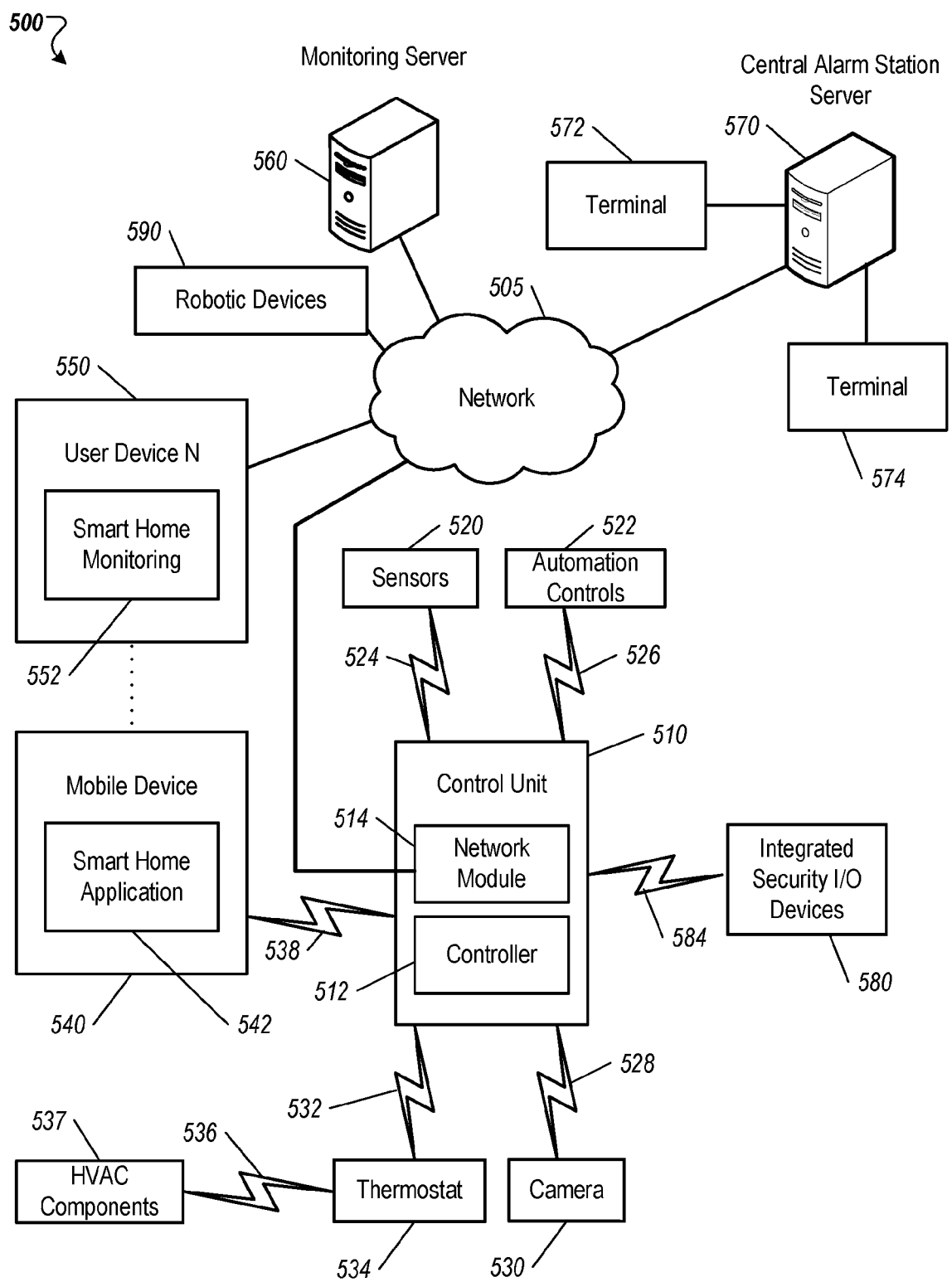
FIG. 5 is a diagram illustrating an example of a home monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones such as the drone 110 shown in FIG. 1-2F that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500. For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    determining, by one or more computers, to begin surveillance of an in-house service with a drone;
    determining, by the one or more computers and using service data, an estimated total time duration of the in-house service;
    determining, by the one or more computers, a location to land the drone during the in-house service that allows observation of the in-house service using the estimated total time duration of the in-house service; and
    initiating, by the one or more computers, landing of the drone at the location that was determined by generating, using the location, one or more instructions to cause the drone to land at the location.

2. The method of claim 1, further comprising receiving an indication of a scheduled start time of the in-house service,
    wherein determining to begin surveillance comprises determining to begin surveillance at the scheduled start time.

3. The method of claim 1, further comprising:
    receiving sensor data indicating an arrival of a service provider to perform the in-house service,
    wherein determining to begin surveillance comprises determining to begin surveillance in response to receiving the sensor data.

4. The method of claim 3, wherein receiving the sensor data comprises receiving one or more of sensor data from a smart lock device indicating that a valid access code has been entered through the smart lock device, sensor data from a magnetic sensor indicating that a door of a property where the in-house service is to take place has been opened, or sensor data from a motion detector indicating detection of motion at a property where the in-house service is to take place.

5. The method of claim 1, wherein determining the estimated total time duration of the in-house service comprises accessing, using a type of the in-house service, a database to determine the estimated total time duration.

6. The method of claim 5, further comprising receiving an indication of the type of in-house service,
    wherein accessing, using a type of the in-house service, a database to determine the estimated total time duration comprises using the received indication of the type of in-house service and the database to determine the estimated total time duration of the in-house service.

7. The method of claim 5, further comprising receiving an indication of an identity of a service provider or a person to perform the in-house service,
    wherein determining the estimated total time duration comprises using the identity of the service provider or the person to determine the estimated total time duration of the in-house service.

8. The method of claim 1, wherein determining the estimated total time duration of the in-house service comprises receiving an indication of the estimated total time duration of the in-house service from a service provider to perform the in-house service.

9. The method of claim 1, wherein determining the estimated total time duration of the in-house service comprises receiving an indication of an approximate total time duration of the in-house service from a user.

10. The method of claim 1, wherein determining the estimated total time duration of the in-house service comprises:
    determining a start time of the in-house service; and
    determining a current time,
    wherein the estimated total time duration is a difference between the start time and the current time.

11. The method of claim 10, wherein the start time is a scheduled start time of the in-house service or an arrival time of a person to provide the in-house service.

12. The method of claim 1, wherein determining the location to land the drone comprises determining a location based on determining that the estimated total time duration of the in-house service satisfies a duration threshold.

13. The method of claim 1, wherein determining the location to land the drone comprises determining a location based on candidate locations specified for the in-house service.

14. The method of claim 1, wherein determining the location to land the drone further comprises determining the location to land the drone using one or more of a current location of the drone, a current location of a person providing the in-house service, or the drone's view of a person providing the in-house service.

15. The method of claim 1, wherein determining the location to land the drone comprises determining whether to land at a charging location or a non-charging location based on at least one of the remaining power of the drone, an anticipated view of the drone at the charging location, an anticipated view of the drone at the non-charging location, a current location of a person providing the in-house service, or an anticipated location of a person providing the in-house service.

16. The method of claim 1, further comprising determining that a power level of the drone is below a threshold power level,
    wherein determining the location to land the drone comprises determining a charging location to land the drone.

17. The method of claim 1, further comprising:

in response to determining to begin surveillance of the in-house service, initiating positioning of the drone so as to place an entrance in a view of the drone, wherein the entrance is of a property where the in-house service is to take place.

18. The method of claim 17, further comprising:

receiving sensor data from a smart lock device of the entrance indicating that a valid access code has been entered through the smart lock device;

determining that the drone has not completed positioning; and sending instructions to the smart lock device to delay or cancel unlocking of the smart lock device.

19. A system comprising:

one or more computers; and one or more computer-readable media storing instructions that, when executed, cause the one or more computers to perform operations comprising:

determining, by the one or more computers, to begin surveillance of an in-house service with a drone;

determining, by the one or more computers and using service data, an estimated total time duration of the in-house service;

determining, by the one or more computers, a location to land the drone during the in-house service that allows observation of the in-house service using the estimated total time duration of the in-house service; and initiating, by the one or more computers, landing of the drone at the location that was determined by generating, using the location, one or more instructions to cause the drone to land at the location.

20. One or more non-transitory computer-readable media storing instructions that, when executed by one or more computers, cause the one or more computers to perform operations comprising:

determining, by the one or more computers, to begin surveillance of an in-house service with a drone;

determining, by the one or more computers and using service data, an estimated total time duration of the in-house service;

determining, by the one or more computers, a location to land the drone during the in-house service that allows observation of the in-house service using the estimated total time duration of the in-house service; and initiating, by the one or more computers, landing of the drone at the location that was determined by generating, using the location, one or more instructions to cause the drone to land at the location.

* * * * *